(12) United States Patent
Takabe

(10) Patent No.: US 8,348,774 B2
(45) Date of Patent: Jan. 8, 2013

(54) CONSTANT VELOCITY JOINT AND CONSTANT VELOCITY JOINT BOOT

(75) Inventor: Shinichi Takabe, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 878 days.

(21) Appl. No.: 11/791,841

(22) PCT Filed: Dec. 12, 2005

(86) PCT No.: PCT/JP2005/022763
§ 371 (c)(1),
(2), (4) Date: Jul. 2, 2009

(87) PCT Pub. No.: WO2008/085418

PCT Pub. Date: Aug. 17, 2006

(65) Prior Publication Data
US 2012/0040765 A1 Feb. 16, 2012

(30) Foreign Application Priority Data

Feb. 14, 2005 (JP) .................................. 2005-036469
Feb. 18, 2005 (JP) .................................. 2005-042495

(51) Int. Cl.
*F16D 3/205* (2006.01)
*F16D 3/84* (2006.01)

(52) U.S. Cl. .................. 464/111; 464/175; 464/905

(58) Field of Classification Search ............ 464/11, 464/904–906, 175, 173, 111
See application file for complete search history.

(56) References Cited

U.S. PATENT DOCUMENTS

| 5,006,376 | A | 4/1991 | Arima et al. |
| 6,471,595 | B1 * | 10/2002 | Neviani ............... 464/175 |
| 6,547,669 | B1 * | 4/2003 | Neviani ............... 464/175 |
| 7,396,286 | B2 * | 7/2008 | Sueoka et al. ......... 464/175 |

(Continued)

FOREIGN PATENT DOCUMENTS

JP 04039419 A * 2/1992

(Continued)

OTHER PUBLICATIONS

Supplementary European Search Report dated Dec. 22, 2009 in corresponding European Application No. 05814222.

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

The outer peripheral surface of the boot attaching section of an outer joint member (2), when viewed in cross section, is non-cylindrical, with a large diameter section (22*a*) and a small diameter section (22*b*) appearing alternately. A thermoplastic elastomer boot (10) is composed of a large end side attaching section (12) adapted to fit on the boot attaching section of the outer joint member (2), a small end side attaching section (14) adapted to fit on a second rotational axis (3), and a bendable section (16) between the large and small end side attaching sections (12, 14), the large end side attaching section (12), when viewed in cross section, being shaped such that its outer peripheral surface is circular and its inner peripheral surface extends along the outer peripheral surface shape of the boot attaching section of the outer joint member (2), with thin-walled sections (12*a*) and thick-walled sections (12*b*) appearing alternately, the whole of the large end side attaching section (12) being filled with material.

22 Claims, 11 Drawing Sheets

U.S. PATENT DOCUMENTS

| | | |
|---|---|---|
| 2003/0134076 A1 | 7/2003 | Wette |
| 2004/0036231 A1* | 2/2004 | Neviani |
| 2004/0116193 A1* | 6/2004 | Toriumi et al. ............... 464/175 |
| 2005/0082769 A1 | 4/2005 | Scholtz et al. |
| 2008/0157484 A1* | 7/2008 | Briton |

FOREIGN PATENT DOCUMENTS

| | | |
|---|---|---|
| JP | 4-124338 | 11/1992 |
| JP | 10-110738 | 4/1998 |
| JP | 10-196673 | 7/1998 |
| JP | 11130952 A * | 5/1999 |
| JP | 2000-79634 | 3/2000 |
| JP | 2001-106885 | 4/2001 |
| JP | 2001-173672 | 6/2001 |
| JP | 2002-013546 | 1/2002 |
| JP | 2002-213484 | 7/2002 |
| JP | 2003-194093 | 7/2003 |
| JP | 2003-329057 | 11/2003 |
| JP | 2004-169726 | 6/2004 |
| JP | 2004-263730 | 9/2004 |
| JP | 2004-360817 | 12/2004 |
| JP | 2005-061435 | 3/2005 |
| JP | 2005-113928 | 4/2005 |
| WO | 02/073057 | 9/2002 |
| WO | 2004/076881 | 9/2004 |

OTHER PUBLICATIONS

Japanese Office Action dated Mar. 10, 2011 issued in corresponding Japanese Patent Application No. 2005-036469 w/English translation.
Japanese Office Action mailed Dec. 7, 2010 in corresponding Japanese Patent Application No. 2005-036469 w/English translation.

* cited by examiner

CONSTANT VELOCITY JOINT AND CONSTANT VELOCITY JOINT BOOT

TECHNICAL FIELD

This invention relates to a constant velocity joint and a constant velocity boot which are used in the power transmission systems of automobiles and various industrial machines.

BACKGROUND ART

Constant velocity joints have a boot mounted thereon to prevent grease sealed therein from leaking into the outside and to prevent foreign matter from intruding into the constant velocity joint. This boot is generally composed of a large end side attaching section adapted to be mounted on a boot attaching section provided at the end of the outer joint member of the constant velocity joint, a small end side attaching section adapted to be mounted on boot attaching section provided on a shaft linked to the constant velocity joint, and a bendable section for integrally linking the two attaching sections. Constant velocity joint boots which are in wide use include one molded of rubber such as chloroprene, and another molded of thermoplastic elastomer.

On the other hand, there are a variety of constant velocity joints including a fixed type constant velocity joint capable of taking a large working angle θ of about 45-50 degrees (Rzeppa type and Birfield type), and a plunging type constant velocity joint having a mechanism which, though not capable of taking so large a working angle, is capable of sliding axially of the outer joint member (double offset type, tripod type, cross groove type). The shape of the outer joint member is varied; the contour of its opening is cylindrical in one type and non-cylindrical in another type. There are many cases where it is more effective to apply the non-cylindrical type from the aspects of weight reduction and processability. As for such boots applied to non-cylindrical outer joint members, chloroprene rubber boots have been used.

Nowadays application of thermoplastic elastomer boots is being investigated (Japanese Unexamined Patent Publication 10-110738, Japanese Unexamined Patent Publication 10-196673, Japanese Unexamined Patent Publication 2002-13546, Japanese Unexamined Patent Publication 2003-194093, Japanese Unexamined Patent Publication 2003-329057).
[Patent Document 1] Japanese Unexamined Patent Publication 10-110738
[Patent Document 2] Japanese Unexamined Patent Publication 10-196673
[Patent Document 3] Japanese Unexamined Patent Publication 2002-13546
[Patent Document 4] Japanese Unexamined Patent Publication 2003-194093
[Patent Document 5] Japanese Unexamined Patent Publication 2003-329057)

DISCLOSURE OF THE INVENTION

Problems to be Solved by the Invention

Chloroprene rubber boots have relatively good performance as constant velocity joint boots. However, they are sometimes not satisfactory from the aspects of fatigue resistance, wear resistance, low-temperature resistance, heat aging resistance, and grease aging resistance, depending on use conditions. Thus, the tendency is toward replacement of them with thermoplastic elastomer boots having superior performance.

In constant velocity joints using an outer joint member whose contour shape is non-cylindrical, however, chloroprene rubber boots have been mainly used. This is because thermoplastic elastomer boots are difficult to mold so as to provide a large diameter attaching section formed in non-cylindrical shape or in complicated shape. In other cases, since thermoplastic elastomers are somewhat lacking in elasticity and high in hardness as their material properties, boot mountability on the outer joint member is unsatisfactory or sealability is insufficient.

When a thermoplastic boot is to be applied to a non-cylindrical outer joint member, it may be contemplated to use a type in which an elastic member (referred to as the bushing) is interposed between a non-cylindrical outer joint member and the large end side attaching section of a cylindrical boot or between the large end side attaching section outer surface of the non-cylindrical boot, with the large end side attaching section being molded to extend along the outer periphery of the outer joint member with respect to the non-cylindrical outer joint member, and a clamp. With this configuration, however, the number of parts increases, which fact is not preferable from the aspects of management and assembling step. Furthermore, the cost will go up. Alternatively, since the bushing needs a certain degree of thickness, its outer diameter dimension will become larger. Further, the sealability in the contact section between the outer joint member and the boot or between the boot and the bushing is insufficient.

On the other hand, it may be contemplated to mold the large end side attaching section of the boot in such a manner as to have a substantially constant thickness and a shape extending along the non-cylindrical outer joint member and tighten the boot outer surface with a clamp extending along the non-cylindrical shape. However, such clamp is complicated in shape, with the cost going up, and its sealability is insufficient.

Means for Solving the Problems

A boot-equipped constant velocity joint according to the invention, which is a constant velocity joint linking a first rotational axis and a second rotational axis, includes an outer joint member torque-transmittably joined to the first rotational axis, an inner joint member torque-transmittably joined to the second rotational axis, a torque transmitting member interposed between the inner and outer joint members to transmit toque, and a thermoplastic elastomer boot mounted between the outer joint member and the second rotational axis to prevent leakage of grease filled in the joint and to prevent foreign matter from intruding into the joint from the outside, wherein the outer peripheral surface of the boot attaching section of the outer joint member, when viewed in cross section, is non-cylindrical with large and small diameter sections appearing alternately, the boot being composed of a large end side attaching section adapted to fit on the boot attaching section of the outer joint member, a small end side attaching section adapted to fit on the second rotational axis, and a bendable section between the large and small end side attaching sections, the large end side attaching section, when viewed in cross section, being shaped such that its outer peripheral surface is circular and its inner peripheral surface extends along the outer peripheral surface of the boot attaching section of the outer joint member shape, with thin-walled and thick-walled sections appearing alternately, the whole of the large end side attaching section being filled with material.

Effects of the Invention

According to the invention, sufficient durability and sufficient sealability are made compatible, the number of parts is minimized, the assembling operation is improved, and cost increase can be suppressed. That is, as compared with chloroprene boots, durability is improved, and sufficient sealability can be secured, so that the reliability of boot performance is improved. Further, the number of parts can be minimized and cost increase can be suppressed. Further, according to the invention, the mountability and positioning of the boot with respect to the outer joint member are stabilized, and the mounting of the boot clamp on the clamp groove is facilitated, thus improving operability during assembling.

These and other objects and features of the invention will become more apparent from the following description with reference to the accompanying drawings.

DESCRIPTION OF THE REFERENCE CHARACTERS

Figure 1:
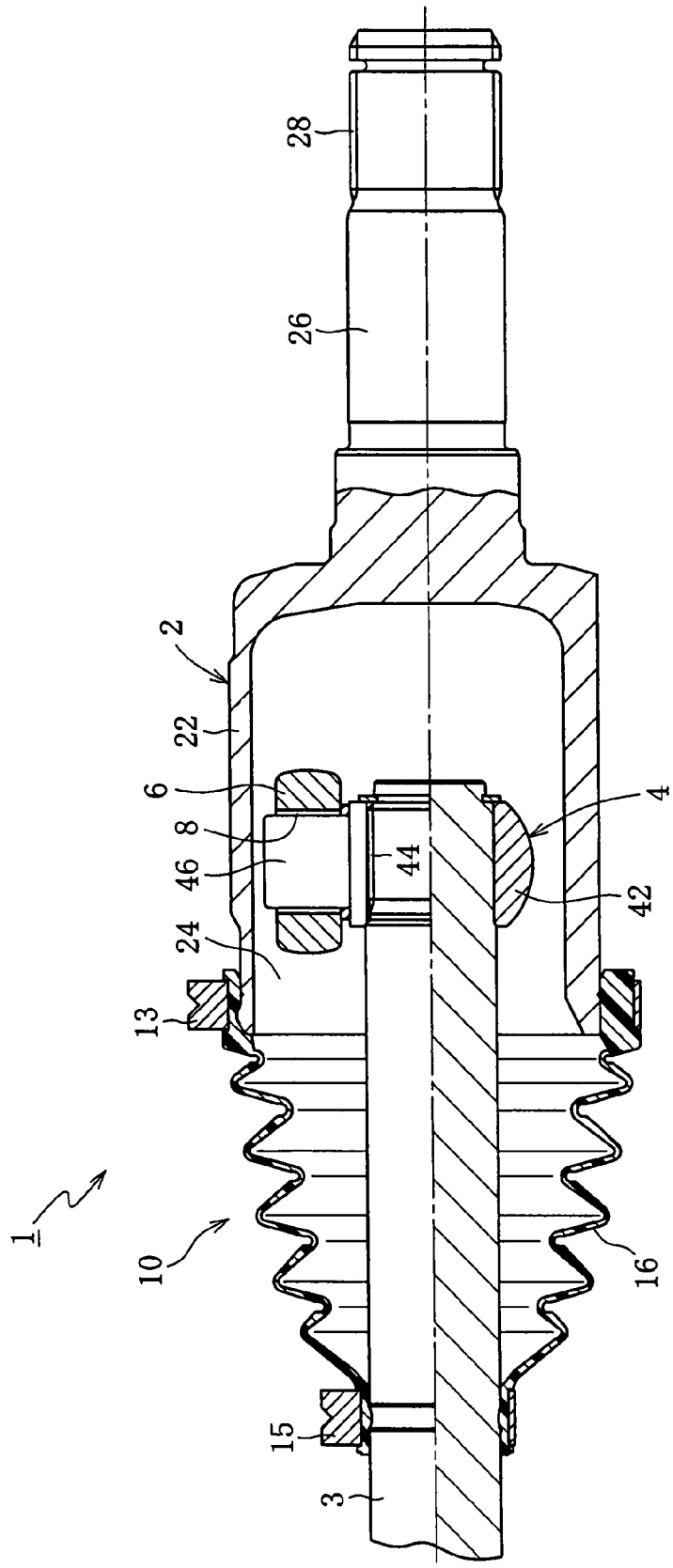
FIG. 1 A longitudinal sectional view of a tripod type constant velocity joint.

1 Tripod type constant velocity joint
2 Outer joint member
22a Mouth section
22a Large diameter section
22b Small diameter section
24 Track groove
30 Boot groove
32 Projection
38 End surface
26 Stem section
28 Spline shaft
4 Tripod member
42 Boss
44 Spline hole
46 Journal
6 Roller
8 Needle roller
10 Boot
12 Large end side attaching section
12a Thin-walled section
12b Thick-walled section
13 Boot clamp
14 Small end side attaching section
15 Boot clamp
16 Bellows (bendable section)
17 Shoulder section
18 Clamp groove
19 Projecting section

BEST MODE FOR CARRYING OUT THE INVENTION

Embodiments will now be described, applied by way of example to a tripod type constant velocity joint provided with a thermoplastic elastomer boot.

Figure 2:
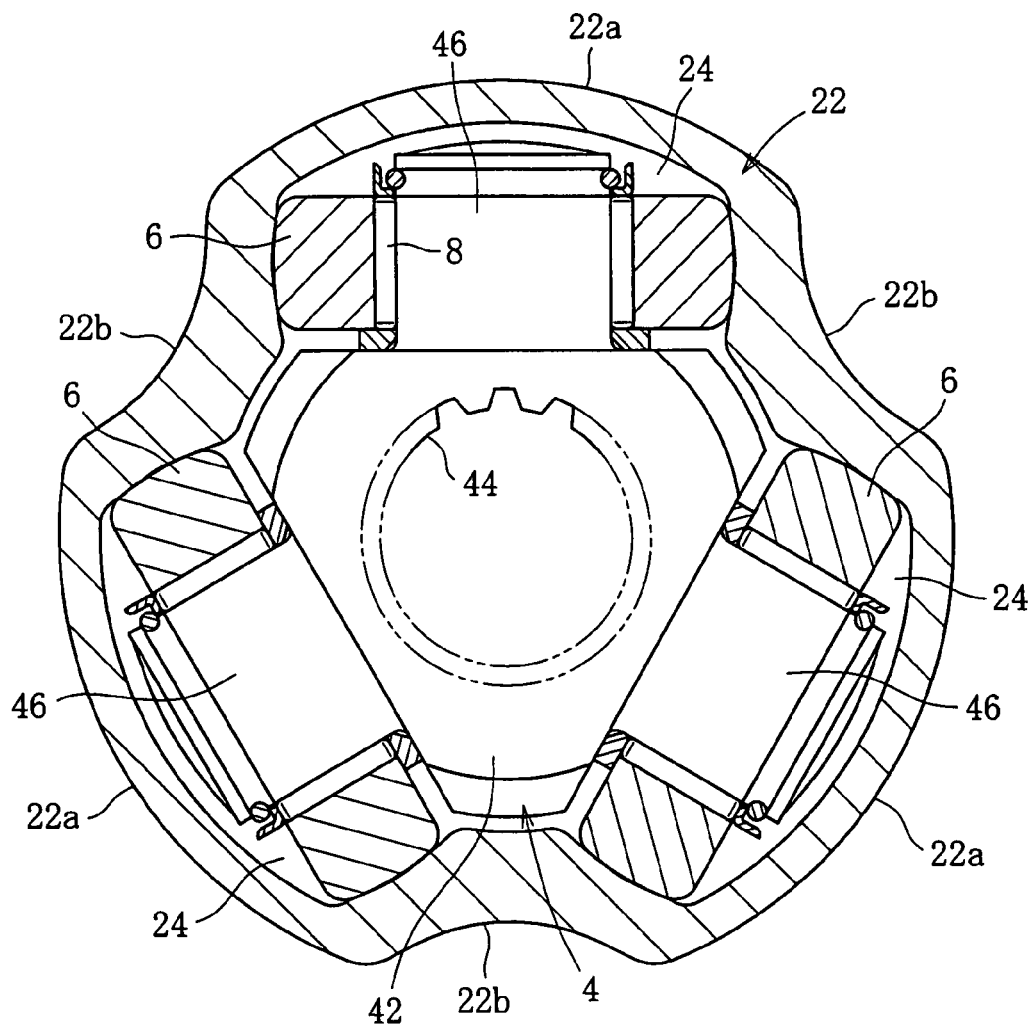
FIG. 2 A cross sectional view of the tripod type constant velocity joint of FIG. 1.

First, as shown in FIGS. 1 and 2, a tripod type constant velocity joint 1 comprises an outer joint member 2, a tripod member 4 serving as an inner joint member, and rollers 6 serving as torque transmitting members, and includes a boot 10.

In the illustrated embodiment, the outer joint member 2 is an integral body consisting of a mouth section 22 and a stem section 26. The stem section 26 has a spline shaft 28 formed at its end, which is torque-transmittably joined to a first rotational axis (not shown). The mouth section 22, which is in the form of a cup opened at one end, has axially extending track grooves 24 formed at circumferentially trisected positions in the inner periphery. The outer peripheral surface of the mouth section, when viewed in cross section (FIG. 2), is non-cylindrical with large and small diameter sections 22a and 22b appearing alternately. In this embodiment, the large diameter sections 22a are convexed arcuate portions corresponding to the track grooves 24, while the small diameter sections are concaved arcuate portions corresponding to portions each between adjoining track grooves 24.

The tripod member 4 is composed of a boss 42 and journals 46. The boss 42 is formed with a spline hole 44 adapted to be torque-transmittably joined to a second rotational axis 3. The journals 46 radially project from circumferentially trisected positions in the boss 42. Each of the journals 46 of the tripod member 4 carries a roller 6. Interposed between the journal 46 and the roller 6 are a plurality of needle rollers 8, the roller 6 being rotatable around the axis of the journal 46. In addition, in FIG. 1, Circlips, washers, and the like used to prevent the rollers 6 from coming off are omitted. Further, here, a structure in which one roller 6 is mounted on one journal 46 is shown by way of example, but the structure may be such that two rollers are simultaneously provided thereon.

Figure 3:
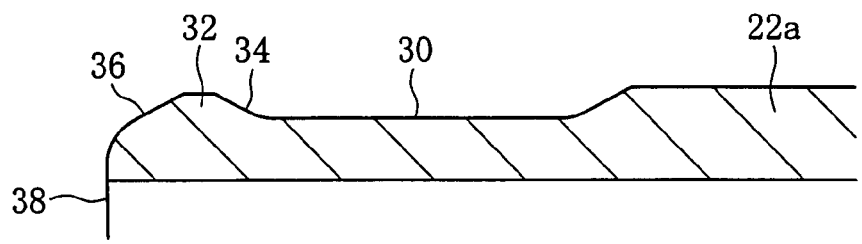
FIG. 3 A partial enlarged view of the outer joint member in FIG. 1.

FIG. 3 is a longitudinal sectional view of the large diameter section 22a of the mouth section 22. As illustrated, a circumferentially extending boot groove 30 is formed in the vicinity of the end. The vicinity of the boot groove 30 will be referred to as the boot attaching section of the outer joint member. The bottom surface of the boot groove 30 is in the form of a partial cylindrical surface and when viewed in longitudinal section, it is a straight parallel with the axis. A projecting section 32 is formed circumferentially of part or all of the large diameter section 22a. The projecting section 32 is preferably positioned in the vicinity of the end surface 38 of the outer joint member 2.

In the illustrated embodiment, the axial opposite sides of the projecting section 32 are slope surfaces 34 and 36. The slope angles of these slope surfaces 34 and 36 with respect to the axis are from 20° to 60°, preferably from 25° to 45°. This improves the efficiency in the lathing of the outer joint member 2 and also improves mountability in fitting the large end side attaching section 12 of the boot 2 on the outer joint member 2 and improves come-out prevention function and positional stability for the boot 10 with respect to the outer joint member 2 after the mounting of the boot.

If the angle of the first slope surface, i.e., the slope surface 34 opposite to the end surface 38 of the outer joint member 2 exceeds 60°, the processability of the boot attaching section of the outer joint member 2 will lower. On the other hand, in the case of less than 25°, this would result in the lowering of radial come-out prevention function and positional stability for the boot 10 after the latter is fitted on the outer joint member 2. It also would result in an axially long projection, which, in turn, causes the entire width of the boot attaching section of the outer joint member 2 to be too large, which fact is not preferable from the aspects of space efficiency and strength. If the angle of the second slope surface, i.e., the slope surface 36 on the end surface 38 side of the outer joint member 2 exceeds 60°, boot mountability will be impaired. On the other hand, in the case of less than 25°, it also would result in the projecting section 32 becoming axially long, which, in turn, causes the entire width of the boot to be too large, which fact is not preferable from the aspects of space efficiency and strength.

The boot 10 is made of thermoplastic elastomer, being filled everywhere with thermoplastic elastomer, there being no void whatsoever. Particularly, if voids are present in the attaching section, the tightening force of the clamp 13 (see FIG. 1) will not be sufficiently transmitted to the boot attaching section of the outer joint member 2, impairing the sealability. Examples of materials employable include thermoplastic elastomers having a durometer hardness, based on JIS K 6253 type D (effective Feb. 1, 1993), of from 35 to 50. In addition, rubber materials such as chloroprene having a durometer hardness, based on JIS K 6253 type A, of 50-70 are also effective, but materials having a high hardness such as thermoplastic elastomers having a durometer hardness, based on JIS K 6253 type D, of 35-50 are more effective.

Figure 4:
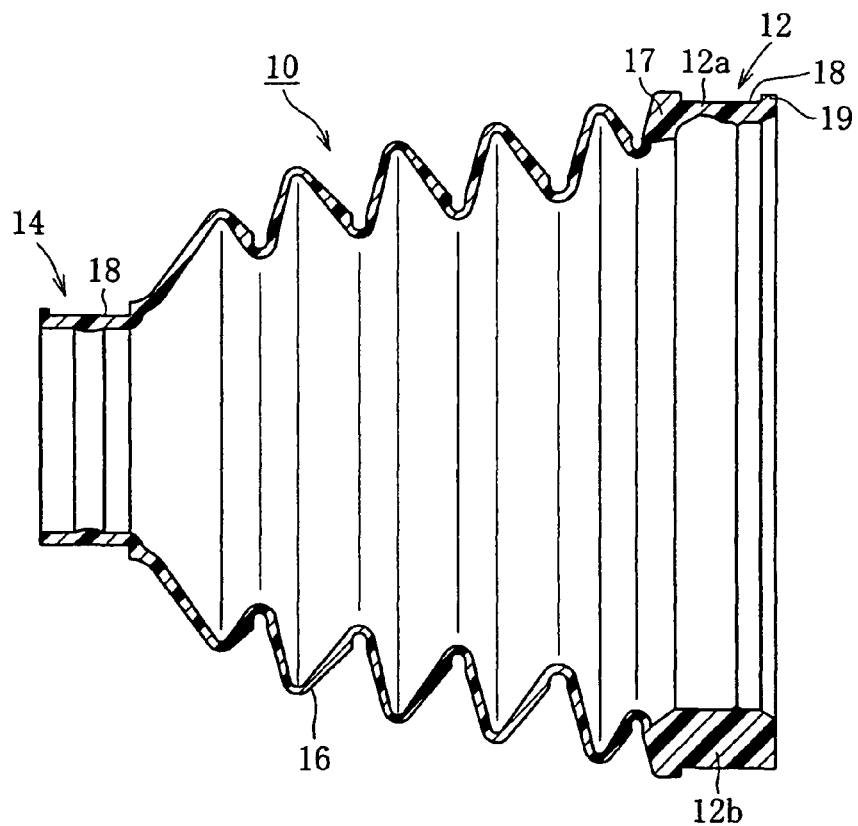
FIG. 4 A longitudinal sectional view of a boot.

As shown in FIG. 4, the boot 10, whose overall outlines are frustoconical, is composed of a large end side attaching section 12, a small end side attaching section 14, and a bendable section 18 disposed therebetween. In the illustrated embodiment, a bellows section is shown as the bendable section 16; however, the invention is also applicable to other than bellows type of boots. It is arranged that the large end side attaching section 12 be fitted on the outer joint member 2 and the small end side attaching section 14 be fitted on the second rotational axis 3 (FIG. 1) and they be tightened by boot clamps 13 and 15, respectively. Consequently, the respective outer peripheries of the attaching sections are formed with clamp grooves 18 for receiving the boot clamps 13 and 15. The bottom surfaces of the clamp grooves 18 are cylindrical and the longitudinal sectional surfaces are parallel with the axis.

The mountability of the boot 10 with respect to the outer joint member 2 is certainly important, but the mountability of the clamps 13 and 15 with respect to the boot 10 is an important factor to be considered in assembling the constant velocity joint. For example, the opposite side walls of each clamp groove 18 may be provided continuously around the entire periphery, in which case, however, the mountability of the clamps will sometimes be lowered. Here, a projecting section 19 forming, of the opposite side walls of each clamp groove 18, particularly the side wall on the end surface side appearing at the right-hand end of FIG. 4 offers no problem of the mountability of the clamp 13, and it is preferable to make the following arrangement as a setting which stabilizes the position of the band 13. That is, as can be seen from FIG. 5, projecting sections 19 are made circumferentially discontinuous and are disposed, for example, at circumferentially trisected positions, each projecting section 19 being dimensioned such that the height is from 0.6 mm to 1.2 mm; the axial dimension is from 0.6 mm to 2.0 mm; and the circumferential dimension is from 10° to 25° as measured from the boot axis.

Figure 5:
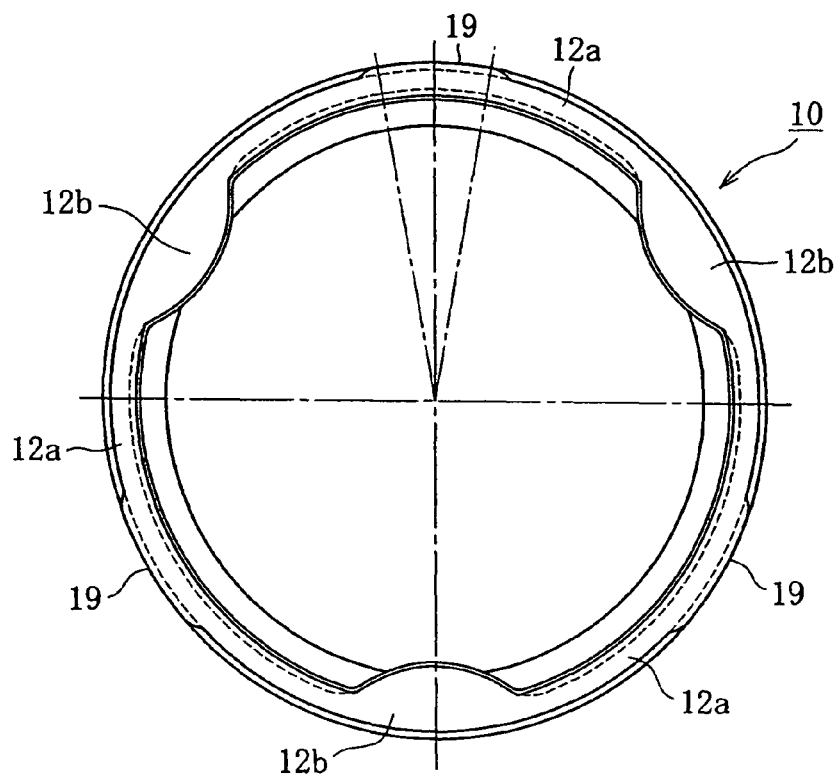
FIG. 5 A right-hand side view of the boot of FIG. 4.

The inner peripheral surface of the large end side attaching section of the boot 10, as shown in FIG. 5, is shaped to extend along the outer peripheral surface shape of the mouth section 22. That is, thin-walled and thick-walled sections 12a and 12b corresponding to the large and small diameter sections 22a and 22b of the mouth section 22 appear alternately.

Figure 6:
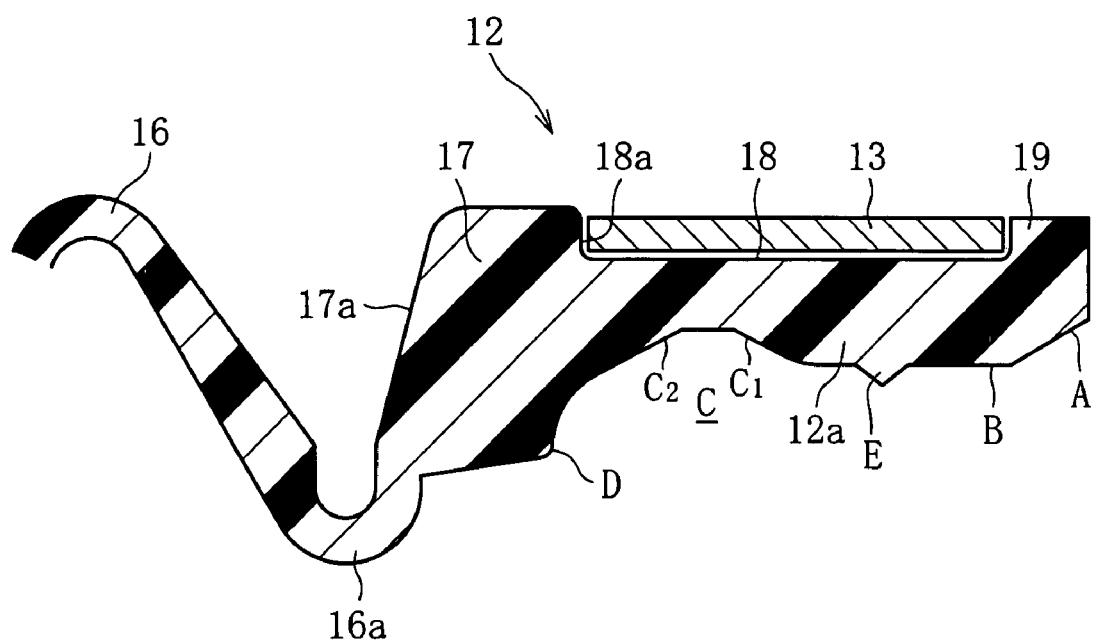
FIG. 6 An enlarged view of the thin-walled section of the boot of FIG. 4.

The inner peripheral surfaces of the thin-walled sections 12a of the large end side attaching section 12, when viewed in longitudinal section, are each formed with a chamfered section A, a straight section B parallel with the axis, a cavity C, and a shoulder guard D continuously in the order mentioned from the end surface side, as shown in FIG. 6.

The chamfered section A extends 1 mm or more from the end surface at an angle of from 20° to 60° with respect to the axis. The provision of such chamfered section A makes it possible to further improve the boot mountability. The diameter of the chamfered section A on the end surface side is set larger than the minimum diameter of the end surface side slope surface 36 of the projecting section 32 of the outer joint member 2. The meeting portion between the end surface side slope surface 36 and the end surface 38 of the projecting section 32 of the outer joint member 2 smoothly joins them together as it is rounded. Thereby, in mounting the boot 10, the chamfered section A of the boot 10 is guided by the rounded portion, so that the mounting of the boot 10 can be effected further smoothly.

To receive the projecting section 32 of the outer joint member 2, the cavity C has slope surfaces $C_1$ and $C_2$ which come in contact with the slope surfaces 34 and 36 of the projecting section 32. These slope surfaces are referred to as the third slope surface $C_1$ and the fourth slope surface $C_2$. Then, the third slope surface $C_1$ corresponds to the first slope surface 34 of the projecting section 32, while the fourth slope surface $C_2$ corresponds to the second slope surface 36 of the projecting section 32. Because of such arrangement, the cavity C fits on the projecting section 32 of the outer joint member 2 to exhibit an axial come-out prevention function.

It is required that the large end side attaching section 12 of the boot 10 be capable of easily mounted on the boot attaching section of the outer joint member 2 and exhibit sufficient sealability when tightened by the clamp 13. Consequently, the cavity C provided in the inner surface of the large end side attaching section 12 of the boot 10 is shaped to extend along the projecting section 32 of the outer joint member 2. The contour of a region extending from the cavity C to the shoulder guard D of the boot 10 substantially coincides with the contour of a region extending from the projecting section 32 to the end surface 38 of the outer joint member 2. And, the shoulder guard D comes in contact with the end surface 38 of the outer joint member 2 to perform the role of stabilizing the axial position of the boot 10.

The shoulder section 17 tying the large end side attaching section 12 to the bendable section 16 is formed with a wall thickness larger than that of the bendable section 16 and large end side attaching section 12. Here, the shoulder section 17 refers to a region extending from the end surface 18*a* on the bendable section 16 side of the clamp groove 18 provided in the large end side attaching section 12 of the boot 10 to the slope surface 17*a* tied to the final root 16*a* of the bendable section 16. It is preferable that the thinnest-wall thickness of the shoulder section 17 be twice or more of the wall thickness of a portion of cavity C which is the thinnest wall section of the large end side attaching section 12. Such arrangement is more effective in a boot whose wall is thin, particularly, whose bellows wall thickness is of from 0.5 mm to 2.0 mm or so.

Figure 8A:
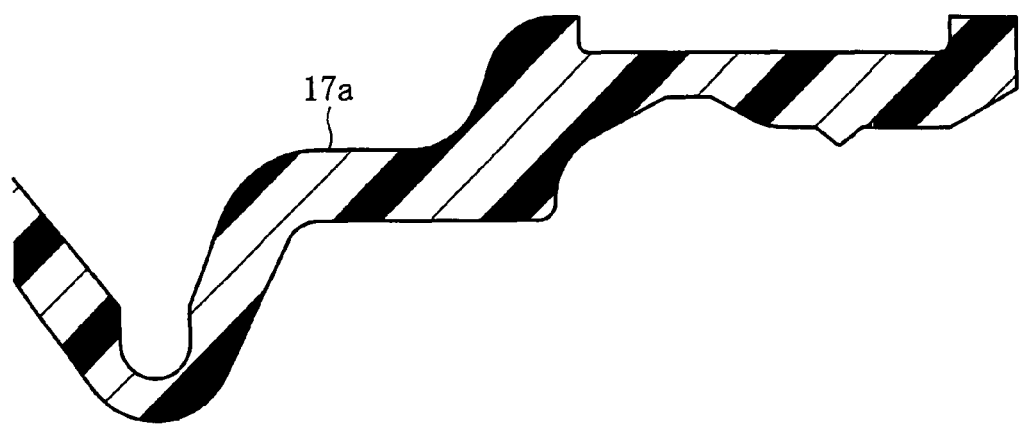
FIG. 8A A partial sectional view of a boot, corresponding to FIG. 6, showing a modification.
Figure 8B:
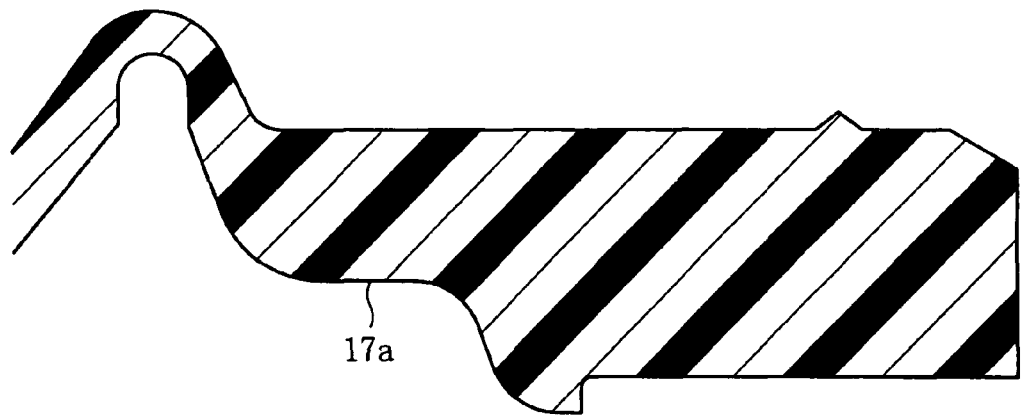
FIG. 8B A partial sectional view of a boot, corresponding to FIG. 7, showing a modification.
Figure 9A:
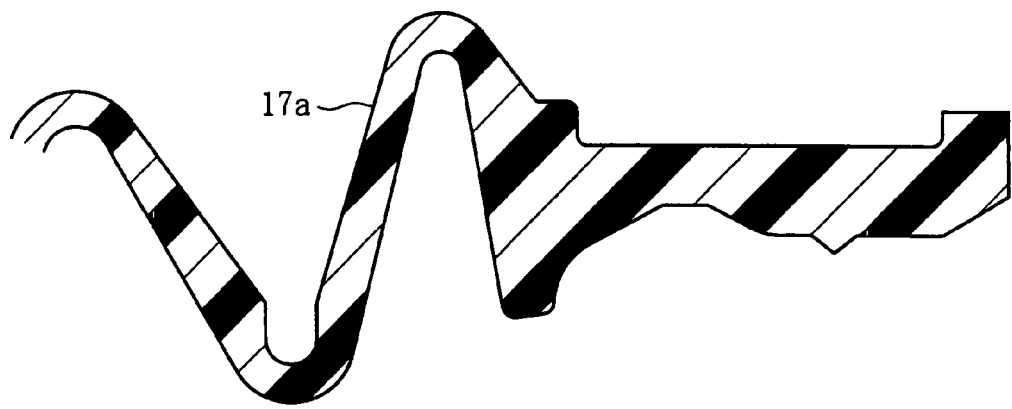
FIG. 9A A partial sectional view of a boot, corresponding to FIG. 6, showing another modification.
Figure 9B:
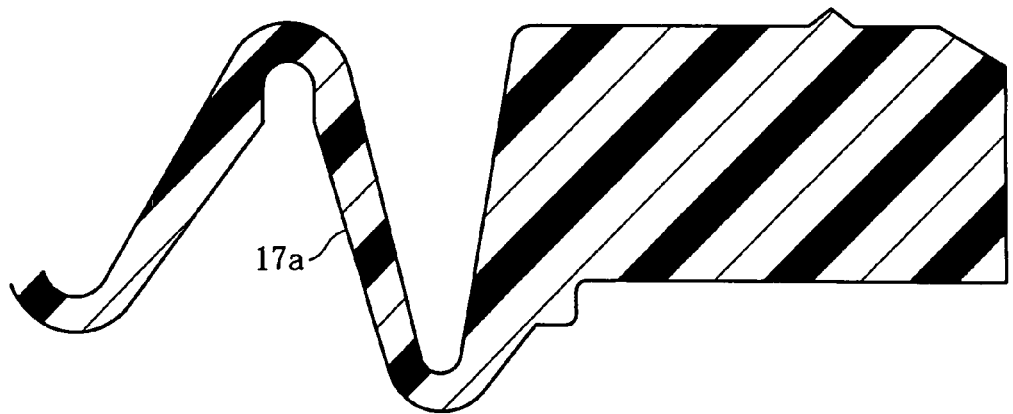
FIG. 9B A partial sectional view of a boot, corresponding to FIG. 7, showing another modification.

The slope surface 17*a*, as illustrated in FIG. 6, may be a slope surface diametrically contracted toward the final root 16*a* or as shown in FIGS. 8A and 8B, it may be cylindrical. Alternatively, as shown in FIGS. 9A and 9B, it may be shaped such that it is diametrically contracted after it is once expanded diametrically outward. Further, the shoulder section 17, as illustrated in FIG. 6, may be so designed as to come in contact with the projecting section 32 or end surface 38 in the boot attaching section of the outer joint member 2, or so designed as to be spaced therefrom.

Figure 7:
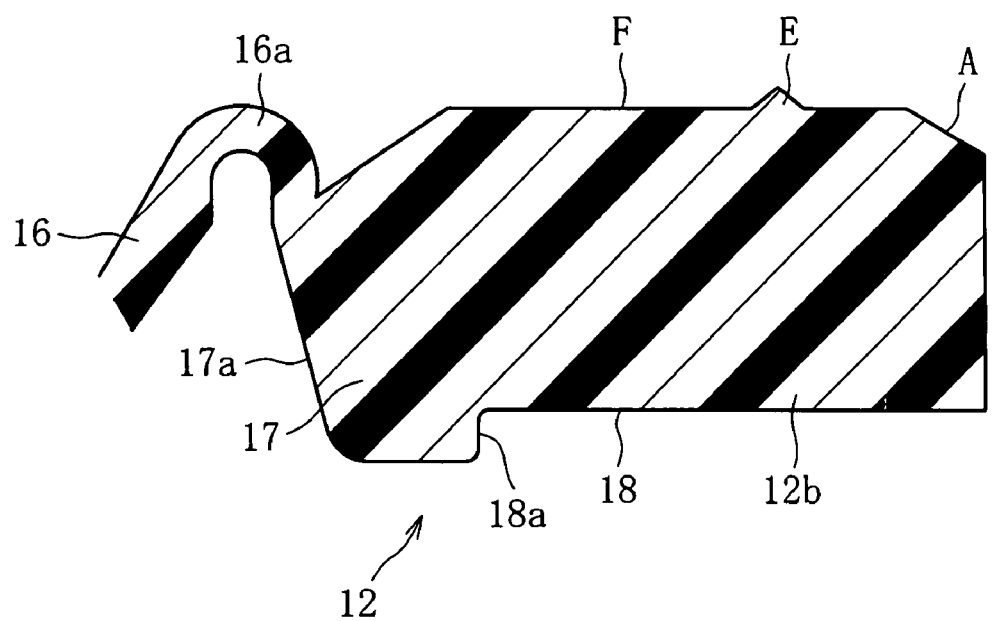
FIG. 7 An enlarged view of the thick-walled section of the boot of FIG. 4.

The inner peripheral surface of the thick-walled section 12*b* in the large end side attaching section 12 of the boot 10, as shown in FIG. 7, is formed with a chamfered section A and a straight section F parallel with the axis continuously from the end surface side. The chamfered section A is the same as that of the thin-walled section already described. As is clear from a comparison between FIGS. 6 and 7, this thick-walled section 12*b* is inevitably thick-walled also in the shoulder section 17.

One of the performances required of constant velocity joint boots is "impact resistance," a main factor for preventing the boot from being broken when flying stones or the like collide thereagainst. Thermoplastic elastomer boots are higher in material strength than chloroprene rubber boots and are also advantageous in terms of impact resistance. However, since thermoplastic elastomer boots are of thin-walled structure having a substantially uniform wall thickness throughout, there will be cases where if a flying stone comes in contact with the boot in the vicinity of the large end side attaching section (the large end side shoulder section of the boot), the boot is broken as it is nipped between the outer race and the stone. This breaking strength will lower as compared with the bendable section, which is capable of dispersing impact force.

If the clearance between the large end side shoulder section and the outer race is kept large in order to secure impact resistance, the boot diameter will increase, which, in turn, causes the axial dimension to increase, impairing the compactness of the boot. Therefore, it is desired that sufficient durability and sufficient impact resistance be made compatible with each other and that the compactness of the boot be maintained, thereby obtaining satisfactory boot performance. By forming the shoulder section, which joins the large end side attaching section and bendable section together, so as to have a greater wall thickness than that of the large diameter attaching section and bendable section, breakage of the boot due to collision with flying stones or the like can be avoided and durability and impact resistance are improved as compared with chloroprene rubber boots, whereby the reliability of boot performance will improve remarkably.

The inner peripheral surface of the large end side attaching section 12 of the boot 10 is formed with a projection E continuously extending around the entire periphery. This projection E is positioned at the straight sections B and F in the thin-walled and thick-walled sections. The cross sectional shape of the projection E may be semi-circular, semi-elliptic or otherwise, but more preferably it is triangular. In the illustrated embodiment, the cross section of the projection E is triangular, with the apex facing radially inward of the boot, i.e., axially. The projection E comes in contact with the boot groove 30 of the outer joint member 2 to exhibit sealing function. Two or more such projections E may be provided. Alternatively, a discontinuous projection separate from the projection E may be provided. Tightening the projection E by the clamp 13 results in the projection E coming in circumferential uniform close contact with the boot groove 30 of the boot attaching section of non-cylindrical shape of the outer joint member 2, thus exhibiting sufficient sealability. The bottom surface of the boot groove 30 with which the projection E comes in close contact is smooth. Various forms of the bottom surface of the boot groove 30 may be contemplated, including one provided with a projection, but it is preferable from the aspect of the number of processing level that the bottom surface be smooth.

Figure 10A:
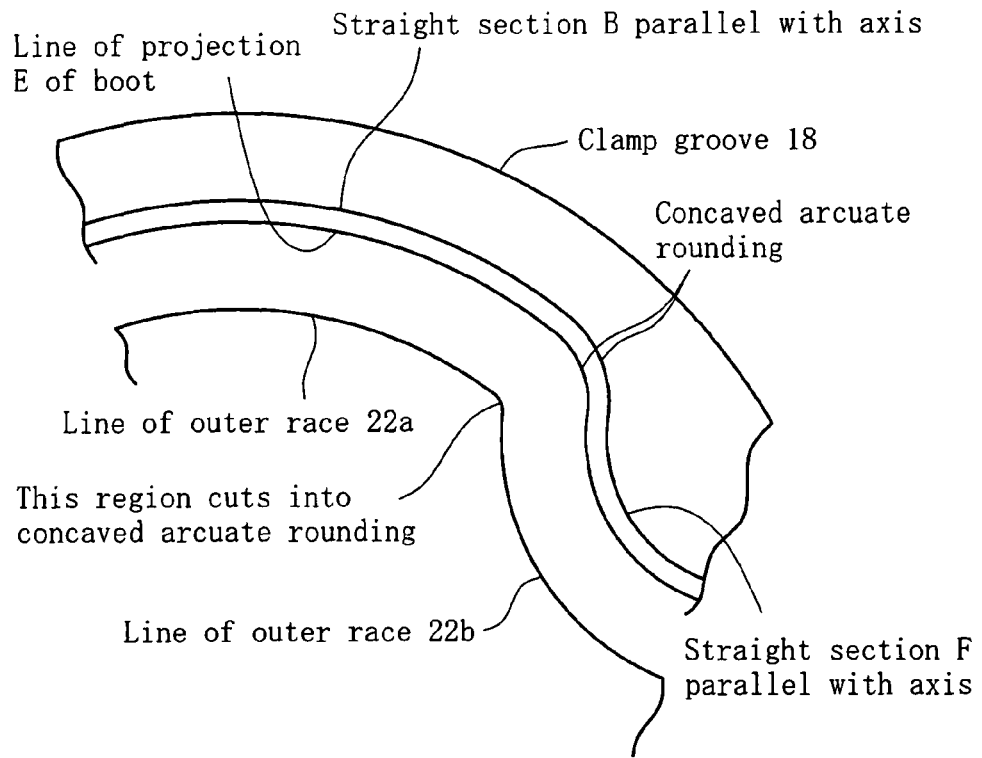
FIG. 10A A detailed view of the contact section between the outer joint member and the boot, showing the two separately.
Figure 10B:
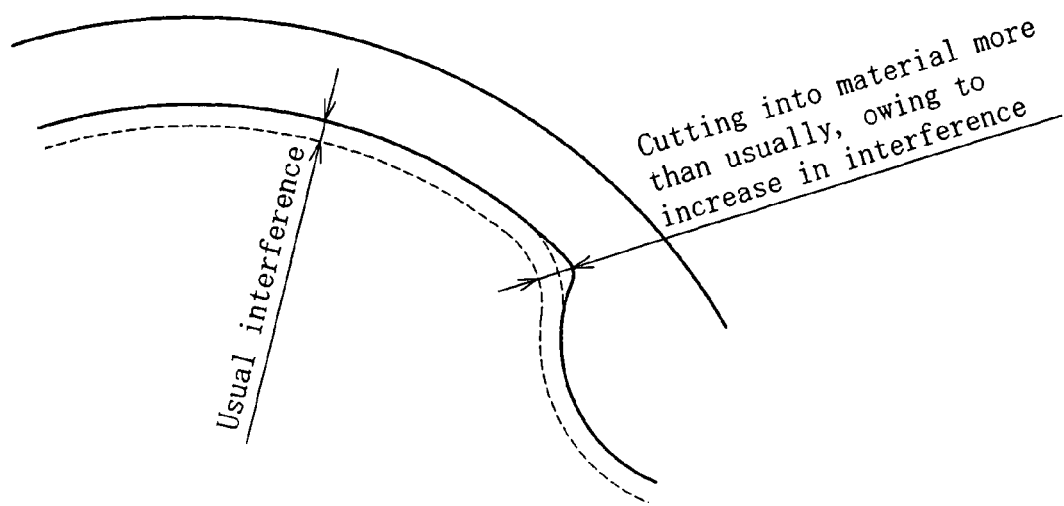
FIG. 10B A detailed view of the contact section between the outer joint member and the boot, showing a state in which the outer joint member is fitted in the boot.

The projection E in the large end side attaching section 12 of the boot 10 is tied in the boundary between the thin-walled and thick-walled sections 12*a* and 12*b* smoothly with concaved arcuate rounding. Thereby, as shown in FIGS. 10A and 10B, in the uniting section between two different curved surfaces in the circumferential end of the boot groove 30 of the outer joint member 2, it becomes possible for the boot to cut into the outer joint member 2 more deeply than into the other region in the ordinary interference, thereby improving sealability. If the radius of curvature is excessively large, however, this will cause the middle portion to "carry," producing a clearance, thus lowering sealability. Therefore, the radius of curvature of the rounding is preferably from 0.5 mm to 5 mm.

The interference between the region consisting of the cavity C and projection E and the boot attaching section of the outer joint member 2 must be so set as to enable the region of the projection E to get over the projecting section 32 of the outer joint member 2 by elastic deformation and as to be capable of maintaining sufficient sealability between the projection E and the boot groove 30 of the outer joint member 2.

In the case where the boot material is high in hardness, as in thermoplastic elastomer, particularly in the case where it is thermoplastic polyester type elastomer having a durometer hardness, based on JIS K 6253 type D, of from 35 to 50, the setting of this interference is important. The interference with respect to the cavity C in the large end side attaching section 12 of the boot 10 is preferably from 0.1 mm to 1.0 mm in terms of radius and the interference with respect to the boot groove 30 at the front end of the projection E is preferably from 0.1 mm to 1.5 mm. Further, the height of the projection E is preferably from 0.3 mm to 1.0 mm.

With the described interference setting, it is possible to mount the large end side attaching section 12 of the boot 10 with the projection E getting over the projecting section 32 of the outer joint member 2. Thereafter, the clamp 13 is tightened, whereby the large end side attaching section 12 of the boot 10 can be attached to the boot attaching section of the outer joint member 2 as it is firmly and closely contacted therewith. If the interference is set at a smaller value than the above, the boot 10 will be deformed at the time the band 13 is tightened, possibly locally producing a clearance. On the other hand, if it is set at a larger value than the above, boot mounting will be difficult. Further, in the case where the height of the projection E is less than 0.3 mm, the close contactability of the outer joint member 2 with the groove 30 is lowered, so that sufficient sealability cannot be obtained. In the case where the height of the projection exceeds 1.0 mm, the volume of the projecting section will become too large to be effective from the aspects of design and sealability.

It is preferable that the cavity C and projection E of the boot 10 be positioned within the limits of the width of the clamp groove 18. Such arrangement results in the tightening force of the clamp being vertically transmitted to the projection E and also results in the axial binding of the cavity C fitting on the projecting section 32 being strengthened, so that stabler sealability is obtained.

Figure 11:
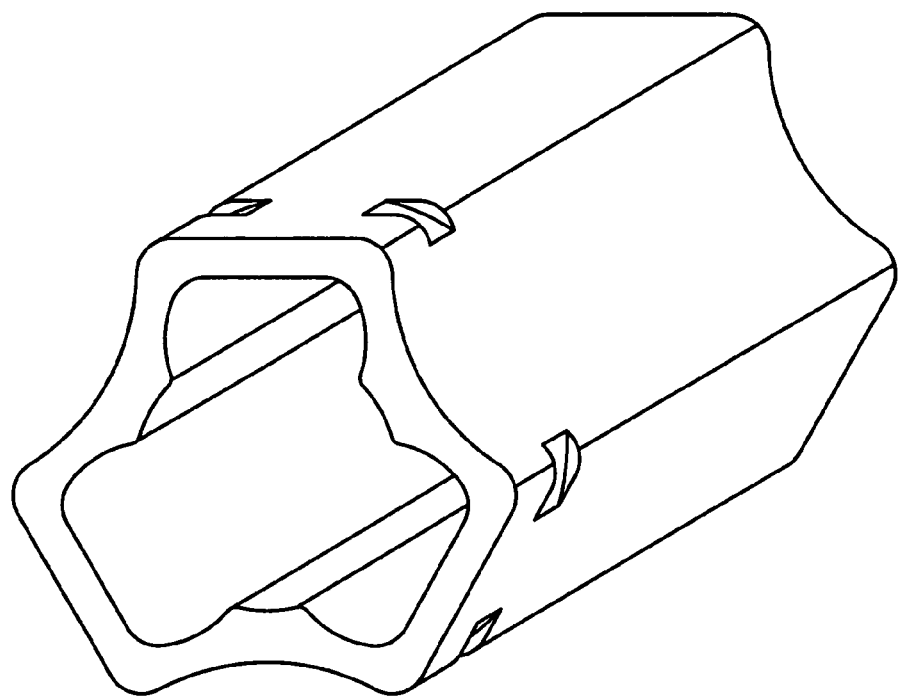
FIG. 11 A perspective view of an outer joint member, showing another embodiment.
Figure 12:
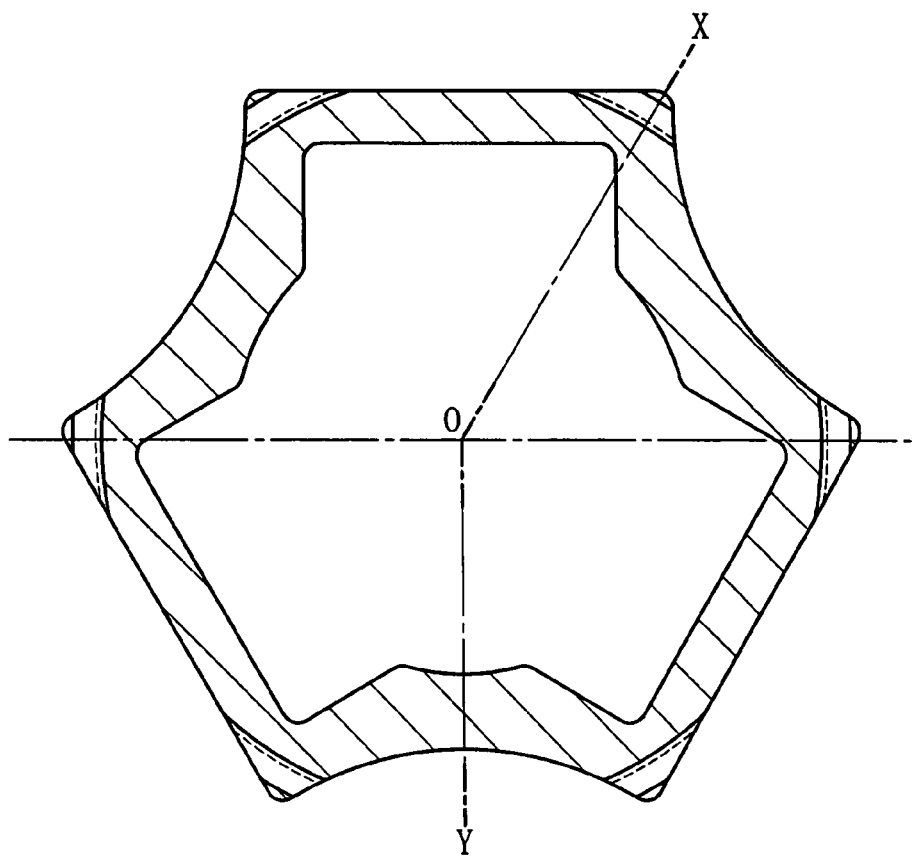
FIG. 12 A cross sectional view of the outer joint member of FIG. 11.
Figure 13:
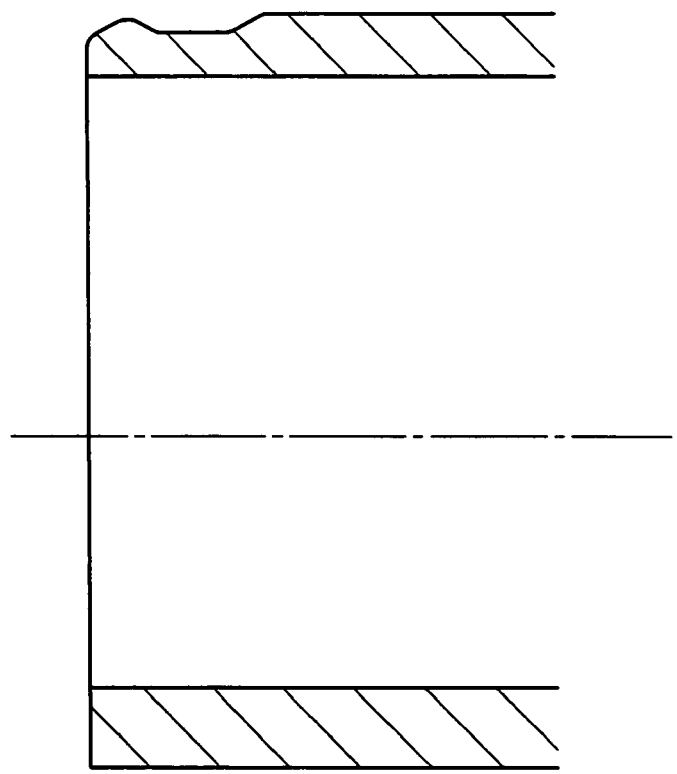
FIG. 13 A sectional view taken along the line X—O—Y of the outer joint member of FIG. 12.
Figure 14:
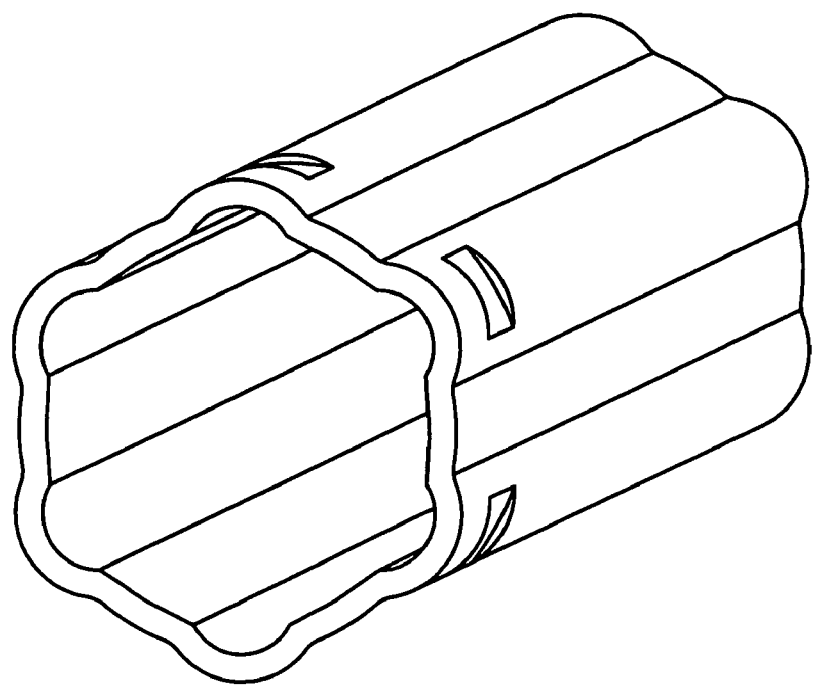
FIG. 14 A perspective view of an outer joint member, showing another embodiment.
Figure 15:
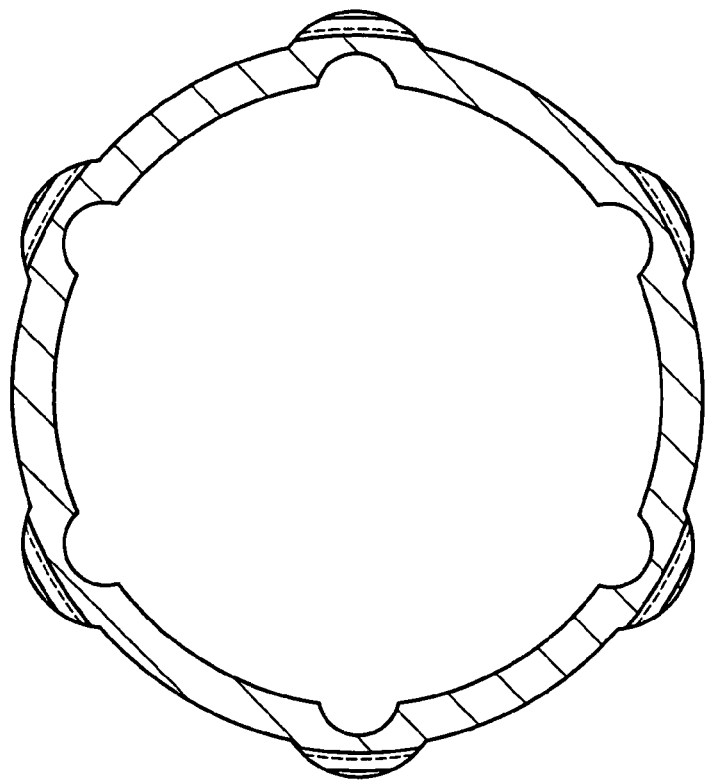
FIG. 15 A cross sectional view of the outer joint member of FIG. 14.
Figure 16:
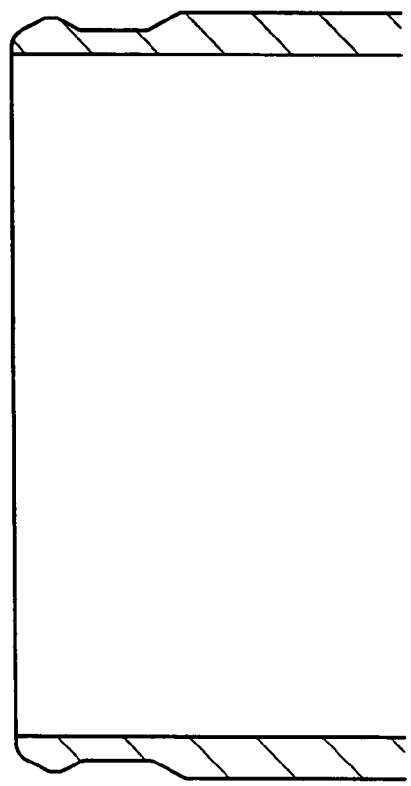
FIG. 16 A longitudinal sectional view of the outer joint member of FIG. 15.
Figure 17:
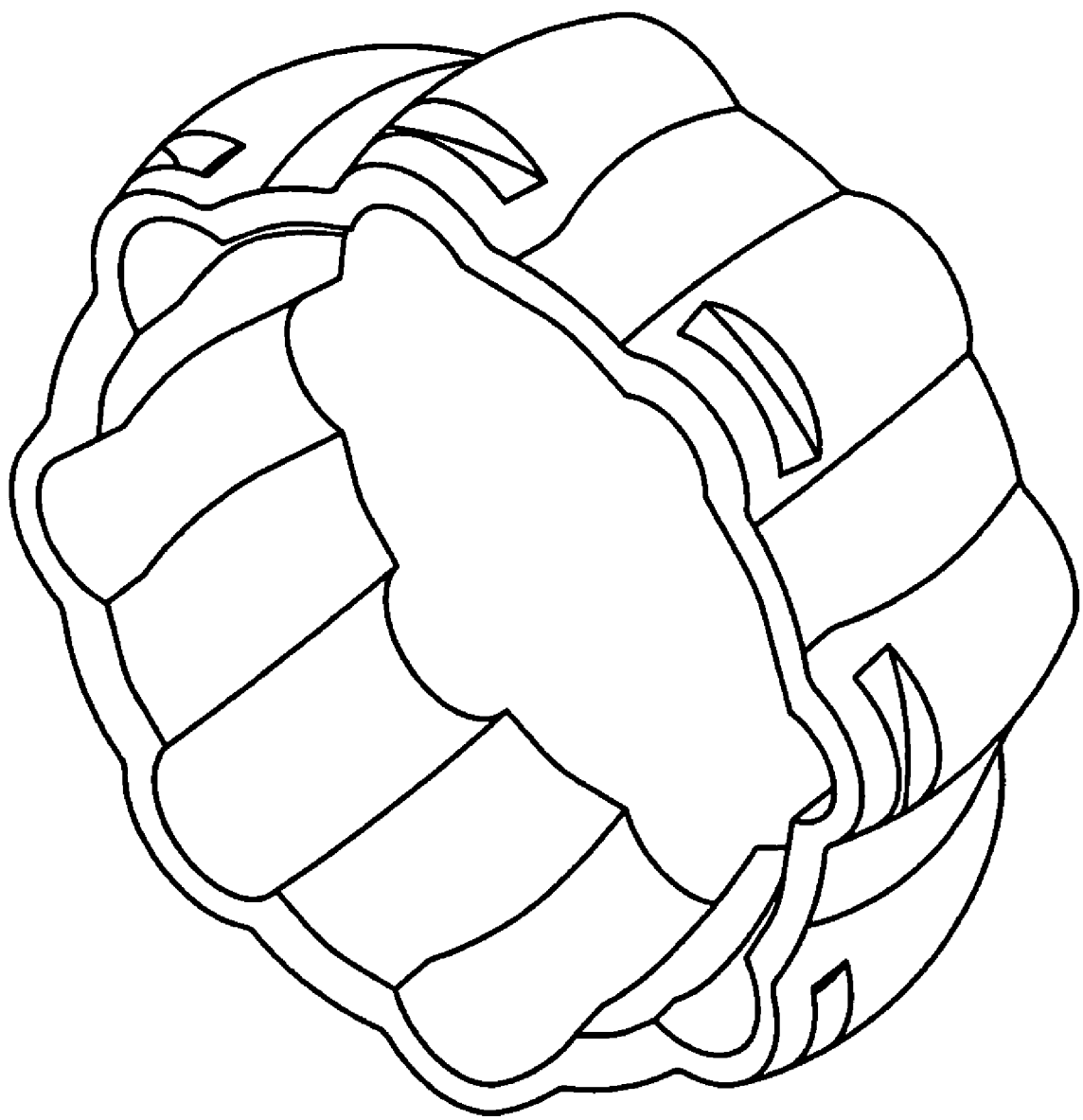
FIG. 17 A perspective view of an outer joint member, showing another embodiment.

In the above description, a tripod type constant velocity joint has been taken as an example; however, the invention is applicable to any constant velocity joint in which the boot attaching section of the outer joint member is non-cylindrical. For example, as shown in FIGS. 11 through 13, it is applicable to one form of the tripod type in which the boot attaching section of the outer joint member is not cylindrical. Further, it is also applicable to other than tripod type of constant velocity joints, such as the double offset type (see FIGS. 14 through 16) and Rzeppa type (see FIG. 17), in which balls are used as torque transmitting members.

The invention claimed is:

1. A constant velocity joint for connection of a first and a second rotational shaft, the constant velocity joint comprising:
    a second rotational shaft;
    an outer joint member for being torque-transmittably joined to a first rotational shaft, the outer joint member including a boot attaching section,
    an inner joint member torque-transmittably joined to the second rotational shaft;
    a torque transmitting member interposed between the inner and outer joint members to transmit torque; and
    a thermoplastic elastomer boot mounted between the outer joint member and the second rotational shaft to prevent leakage of grease filled in the joint and to prevent foreign matter from intruding into the joint from the outside,
    wherein an outer peripheral surface of the boot attaching section of the outer joint member is non-cylindrical, with alternately disposed large and small diameter sections,
    wherein said boot includes a large end side attaching section adapted to fit on the boot attaching section of the outer joint member, a small end side attaching section adapted to fit on the second rotational shaft, and a bendable section between the large and small end side attaching sections,
    wherein said large end side attaching section of the boot is shaped such that its outer peripheral surface is circular and its inner peripheral surface extends along the outer peripheral surface of the boot attaching section of the outer joint member, and the whole of the large end side attaching section is filled with material,
    wherein the inner peripheral surface of the large end side attaching section of the boot includes alternately disposed thick-walled sections and thin-walled sections,
    wherein the inner peripheral surface of the large end side attaching section of the boot includes a projection,
    wherein the outer peripheral surface of the boot attaching section of the outer joint member has a boot groove and a projecting section positioned on an end surface side of the outer joint member, said projecting section being larger in diameter than said boot groove, said projecting section having a first slope surface gradually diametrically contracted in a direction leading away from an end surface of the outer joint member, and a second slope surface gradually diametrically expanded from the end surface,
    wherein an outer periphery of the large end side attaching section of the boot is formed with a clamp groove for receiving a boot clamp,
    wherein at least one of the thin-walled sections is formed with a chamfered section, a shoulder guard, a straight section between the chamfered section and the shoulder guard, and a cavity between the straight section and the shoulder guard,
    wherein at least one of the thick-walled sections is formed with a chamfered section and a straight section,
    wherein the cavity of the boot has a third slope surface and a fourth slope surface, and
        wherein the projecting section of the outer joint member is disposed in the cavity of the boot with the third slope surface of the cavity in contact with the first slope surface of the projecting section and the fourth slope surface of the cavity in contact with the second slope surface of projecting section, wherein the clamp groove has a first edge and a second edge, and a width of the clamp groove extends in an axial direction of the boot from the first edge to the second edge, and
    wherein the projection and cavity of the boot are positioned between the first edge and the second edge of the clamp groove in the axial direction of the boot.

2. A constant velocity joint as set forth in claim 1, wherein the cross section of the projection is triangular, with the apex facing a longitudinal axis of the boot.

3. A constant velocity joint as set forth in claim 1, wherein the angles of the first and second slope surfaces of the projecting section with respect to a longitudinal axis of the outer joint member are from 25° to 60°.

4. A constant velocity joint as set forth in claim 1, wherein the angle of the chamfered section of the boot with respect to a longitudinal axis of the boot is from 20° to 60°.

5. A constant velocity joint as set forth in claim 1, wherein the boot includes projecting sections which form a side wall on the end surface side of the clamp groove of the boot and are circumferentially intermittently disposed.

6. A constant velocity joint as set forth in claim 5, wherein each projecting section is dimensioned such that the height is from 0.6 mm to 1.2 mm; the width is from 0.6 mm to 2.0 mm; and the circumferential length is from 10° to 25°.

7. A constant velocity joint as set forth in claim 1, wherein the material of the boot is thermoplastic polyester type elastomer having a durometer hardness, based on JIS K 6253 type D, of from 35 to 50.

8. A constant velocity joint as set forth in claim 1, wherein a shoulder section of the boot connecting the large end side attaching section to the bendable section is greater in wall thickness than the large end side attaching section and bendable section.

9. A constant velocity joint as set forth in claim 1, wherein the boot groove extends circumferentially around the outer joint member, and wherein the clamp groove extends circumferentially around the boot.

10. A constant velocity joint as set forth in claim 1, further comprising a boot clamp disposed in the clamp groove.

11. A constant velocity joint as set forth in claim 1, wherein the straight section of the at least one thin-walled section is parallel with a longitudinal axis of the boot, and
wherein the straight section of the at least one thick-walled section is parallel with the longitudinal axis of the boot.

12. A constant velocity joint as set forth in claim 1, wherein the inner peripheral surface of the large end side attaching section of the boot includes a plurality of projections.

13. A constant velocity joint as set forth in claim 12, wherein the cross section of the projections is triangular, with the apex facing a longitudinal axis of the boot, and
wherein the angles of the first and second slope surfaces of the projecting section with respect to a longitudinal axis of the outer joint member are from 25° to 60°.

14. A constant velocity joint as set forth in claim 1, wherein the boot is mounted on the outer joint member such that the inner end surface of the shoulder section tying the large end side attaching section to the bendable section comes in contact with the end surface of the outer joint member.

15. A constant velocity joint boot for being mounted between an outer joint member and a second rotational axis of a constant velocity joint to prevent leakage of grease filled in the joint and to prevent foreign matter from intruding into the joint from the outside, the boot comprising:
a large end side attaching section adapted to fit on a boot attaching section of the outer joint member;
a small end side attaching section adapted to fit on the second rotational axis; and
a bendable section between the large and small end side attaching sections,
wherein the boot is made of thermoplastic elastomer,
wherein said large end side attaching section of the boot is shaped such that its outer peripheral surface is circular and its inner peripheral surface extends along an outer peripheral surface of the boot attaching section of the outer joint member shape, and the whole of the large end side attaching section is filled with material,
wherein the inner peripheral surface of the large end side attaching section of the boot is formed with projections throughout the periphery,
wherein an outer periphery of the large end side attaching section of the boot is formed with a clamp groove for receiving a boot clamp,
wherein the inner peripheral surface of the large end side attaching section of the boot is formed with a chamfered section, a shoulder guard, a straight section between the chamfered section and the shoulder guard, and a cavity between the straight section and the shoulder guard,
wherein the cavity of the boot is adapted to receive a projecting section of the outer joint member, and the cavity has a third slope surface and a fourth slope surface adapted to come in contact with a first slope surface and a second slope surface of the projecting section of the outer joint member, respectively,
wherein the clamp groove has a first edge and a second edge, and a width of the clamp groove extends in an axial direction of the boot from the first edge to the second edge, and
wherein the projection and cavity of the boot are positioned between the first edge and the second edge of the clamp groove in the axial direction of the boot.

16. A constant velocity joint boot as set forth in claim 15, wherein a shoulder section of the boot connecting the large end side attaching section to the bendable section is greater in wall thickness than the large end side attaching section and bendable section.

17. A constant velocity joint boot as set forth in claim 16, wherein said shoulder section is a portion extending from an end surface on the bendable section side of the clamp groove provided in the large end side attaching section to a slope surface tied to a final root of the bendable section.

18. A constant velocity joint boot as set forth in claim 15, wherein said boot is made of thermoplastic polyester type elastomer having a durometer hardness, based on JIS K 6253 type D, of from 35 to 50.

19. A constant velocity joint boot as set forth in claim 15, wherein the outer peripheral surface of the boot attaching section of the outer joint member is cylindrical and the inner peripheral surface of the large end side attaching section of the boot is cylindrical.

20. A constant velocity joint boot as set forth in claim 19, wherein a shoulder section of the boot connecting the large end side attaching section to the bendable section is greater in wall thickness than the large end side attaching section and bendable section.

21. A constant velocity joint boot as set forth in claim 15, wherein the boot attaching section of the outer joint member has a non-cylindrical outer peripheral surface, with alternately disposed large and small diameter sections, and the large end side attaching section of the boot has an inner peripheral surface extending along the contour of the boot attaching section of the outer joint member.

22. A constant velocity joint boot as set forth in claim 15, wherein the boot is mounted on the outer joint member such that the inner end surface of the shoulder section tying the large end side attaching section to the bendable section comes in contact with the end surface of the outer joint member.

* * * * *